United States Patent [19]

Marantette et al.

[11] 4,052,653

[45] Oct. 4, 1977

[54] ANALOG DATA RECORDING AND PLAYBACK SYSTEM FOR PATH CONTROL

[76] Inventors: William E. Marantette; Ruth B. Marantette, both of 20624 Earl St., Torrance, Calif. 90503

[21] Appl. No.: 633,484

[22] Filed: Nov. 19, 1975

[51] Int. Cl.² .............................................. G05B 19/42
[52] U.S. Cl. .................................................... 318/568
[58] Field of Search ......................... 318/568, 603, 162

[56] References Cited

U.S. PATENT DOCUMENTS

| | | | |
|---|---|---|---|
| 2,628,539 | 2/1953 | DeNeergaard | 318/568 X |
| 2,777,354 | 1/1957 | Stickney et al. | 318/568 X |
| 2,861,255 | 11/1958 | Mexhler et al. | 318/568 X |
| 3,072,833 | 9/1963 | Kerr et al. | 318/568 X |
| 3,192,796 | 7/1965 | Peeps et al. | 318/568 X |
| 3,700,992 | 10/1972 | Pontigny | 318/568 |

Primary Examiner—Robert K. Schaefer
Assistant Examiner—John J. Feldhaus
Attorney, Agent, or Firm—Ralph B. Pastoriza

[57] ABSTRACT

Movements of a table are optically recorded on film by mechanically gearing movement of the table to rotate a drum provided with a peripheral row of slots positioned above the film. A light is directed through the slots onto the film as the film is moved and the drum rotated thereby exposing the film to bars of light images which are skewed in accordance with the relative rate of rotation of the drum and speed of movement of the film. Playback is accomplished by developing the film and then passing light through the clear film between the new opaque exposed bars of light images on the film and slots in the drum to suitable photo-cells. During playback the film may be moved at a constant speed and the drum will remain in synchronism with the film and in view of its direct gearing to the table, the table will follow movements determined by the pattern on the film. The photo-cells provide signals in response to any tendency of the drum to move out of synchronism with the bars of light images on the film to bring the drum and thus the table movements into synchronism with the recorded program.

2 Claims, 5 Drawing Figures

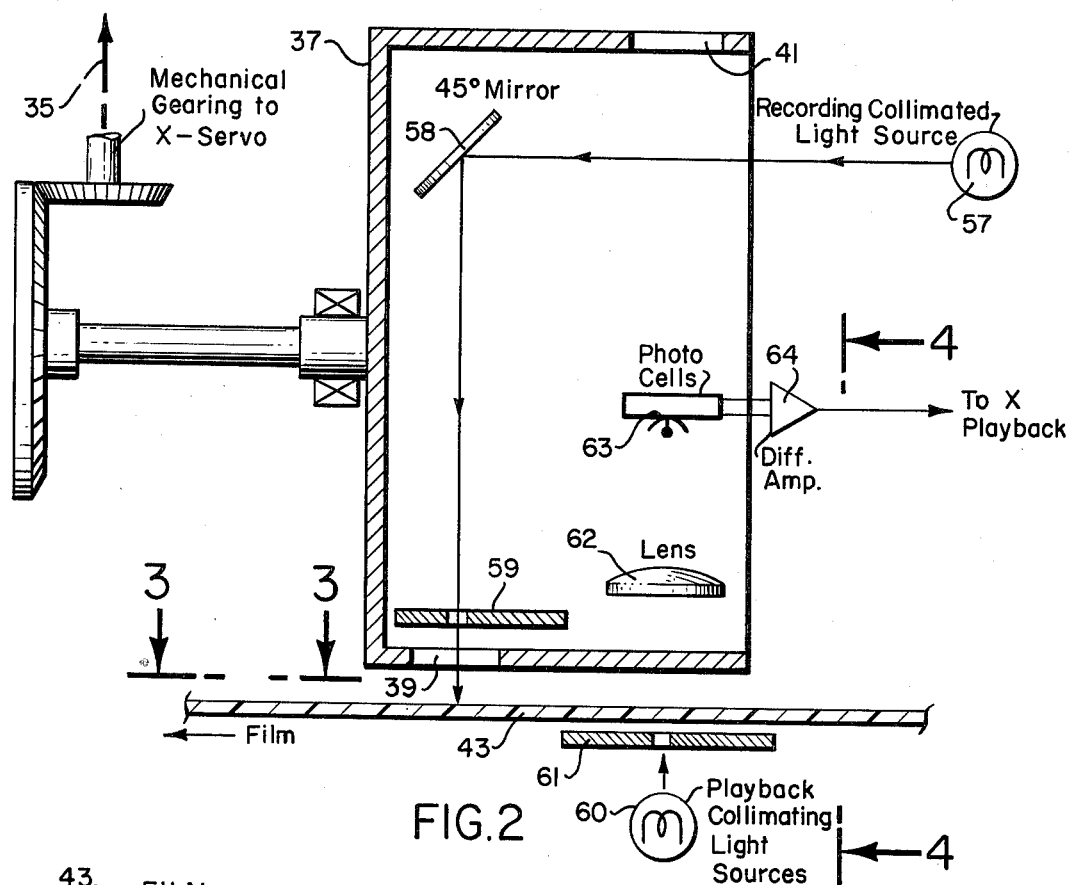
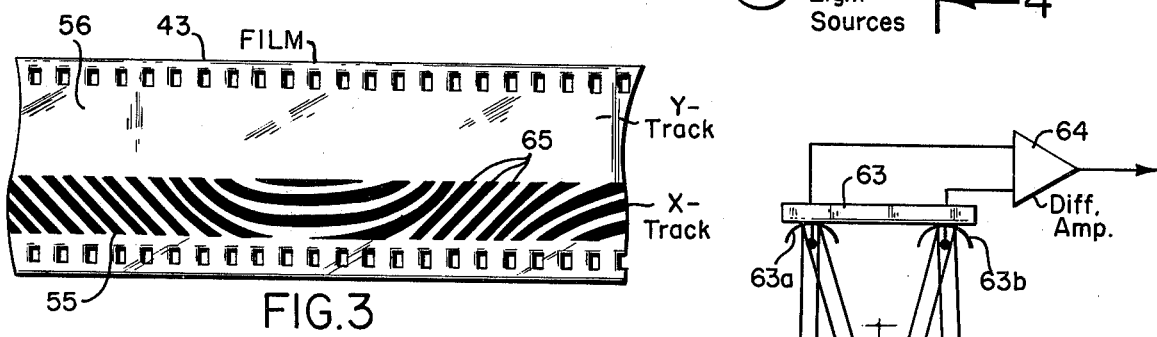
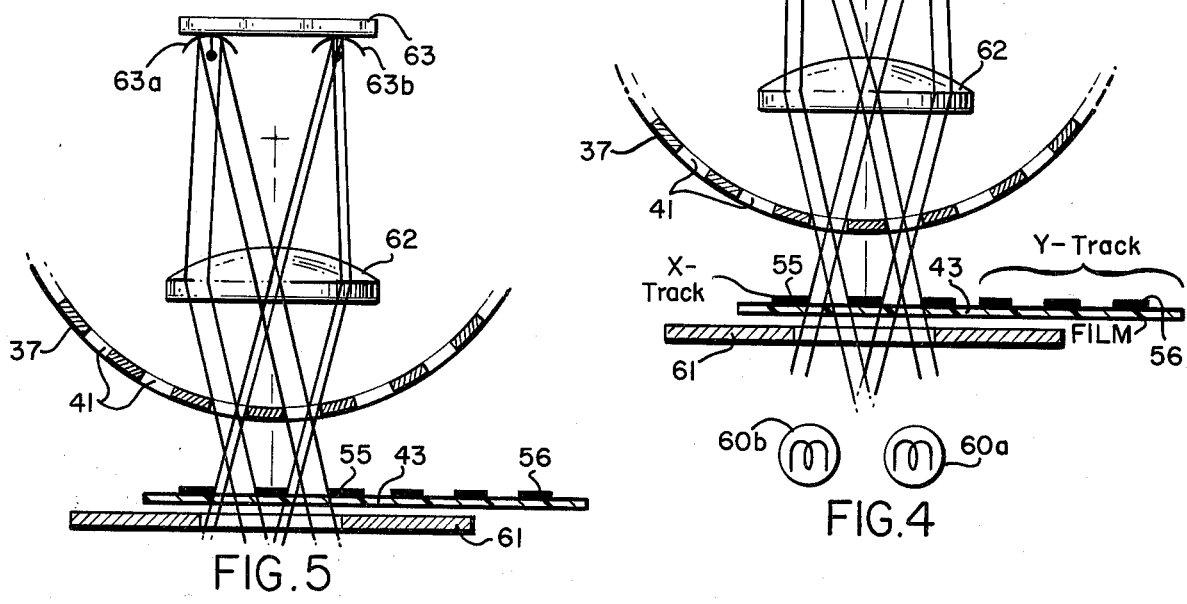

ANALOG DATA RECORDING AND PLAYBACK SYSTEM FOR PATH CONTROL

This invention relates generally to methods and systems for recording movements and more particularly to an analog data recording and playback system utilizing photographic film for controlling movement of a table or equivalent machine element along a selected path.

BACKGROUND OF THE INVENTION

During the fabrication of circuit boards, one of the last operations to be done is to trim off the excess material around the periphery of the finished board and bring its outside dimensions to size. Since the center part of the board may require some large or odd-shaped holes to be cut, a common method of manufacture is to move the equipment along a pre-selected path or route the same over the board to the specific locations of the odd centered cut-outs as well as to route the equipment about the outside periphery with a template controlled manual machine similar to an engraving machine.

Recently, expensive automatic high production machines using computer path control technology are being used for the routing operations.

The present invention was developed as a low-cost substitute for the high cost computer-type system to do the relatively simple routing operations.

BRIEF DESCRIPTION OF THE PRESENT INVENTION

With the foregoing in mind, the present invention contemplates a method and system for recording analog data defining movement of a table such as a printed circuit board carrier along a selected path all to the end that the same path can readily be repeated by simply playing back the recorded movements. While the invention is principally applicable to the above-described example of printed circuit boards, it should be understood that the basic principles involved are applicable to any system wherein it is desirable to store analog type data and permit playing back of the data subsequently to cause an element in a machine operation to repeat its desired movements.

Briefly, the basic method steps of the present invention include moving a table or equivalent machine element along a selected path and simultaneously moving a photographic film which serves as a recording medium in a longitudinal direction at a speed proportional to the speed of movement of the table. A row of light apertures is mechanically coupled to the table to cause the light apertures to pass transversely across the film at a rate determined by the speed of movement of the table. A beam of light is then passed through the apertures towards the film to thereby successively expose on the film bars of light images as the film moves. These bars will be skewed relative to the direction of movement of said film in accordance with the relative rate of movement of the apertures and speed of movement of the film so that there is optically recorded on the film a pattern of bars of light images defining the movement of the table along the selected path.

The present invention also contemplates additional method steps for reproducing movement of the table from the developed film upon which the optically recorded bars of light images are now opaque. These steps include moving of the film in a longitudinal direction at any desired selected speed and providing a row of light apertures mechanically coupled to the table so that they will pass transversely across the film when the table moves. These light apertures are spaced the same as the light apertures utilized in making the initial recording. Light from two slightly angled light sources is then passed between adjacent bars of the light images on the film and adjacent apertures overlying the film. The relative intensities of the light is then detected and the table is caused to move in response to the difference in light intensities from the respective apertures in a direction to minimize such difference so that the apertures will stay in synchronism with the bars of light images on the moving film and the table will follow the selected path defined by the pattern of bars of light images on the film.

The preferred apparatus for carrying out the method includes servo-motor means for moving the table along the selected path and a drum provided with a circumferential row of peripheral slots. This drum is directly mechanically geared to movement of the table so that it will rotate at a rate proportional to the speed of movement of the table.

A film such as a 35-mm. motion picture type film is driven longitudinally adjacent to the periphery of the slots on the drum in a direction corresponding to the axis of the drum. The speed of movement of the film during recording is controlled by the movement of the table. A recording source of light is passed radially from the interior of the drum through the apertures towards the film so that the desired exposed bars of light images result on the film, these bars being skewed in accord with the relative rate of rotation of the drum and speed of movement of the film.

In a preferred embodiment wherein movement of the table takes place in an X, Y coordinate system, there is provided a drum for recording movements in the X axis direction and a further drum for recording movements in the Y axis direction, the film being common to both drums but the drums being positioned such that the recordings for movements in the X direction are adjacent one edge of the film and the recording for movements in the Y direction are adjacent another edge, both recordings being made on the same film. Playback of the recorded information can be accomplished utilizing the same film transport and drums involved in the recording.

BRIEF DESCRIPTION OF THE DRAWINGS

A better understanding of this invention will be had by now referring to the accompanying drawings in which:

FIG. 2 is a fragmentary cross section of one of the drums shown in FIG. 1 looking in the direction of the arrows 2—2 of FIG. 1;

FIG. 3 is a fragmentary plan view of a portion of the film in FIG. 2 looking in the direction of the arrows 3—3;

FIG. 4 is a fragmentary front elevational view of the drum of FIG. 2 looking in the direction of the arrows 4—4; and, FIG. 5 is a view similar to FIG. 4 but illustrating a slight displacement of the drum relative to the film.

DETAILED DESCRIPTION OF THE PREFERRED EMBODIMENT

Figure 1:
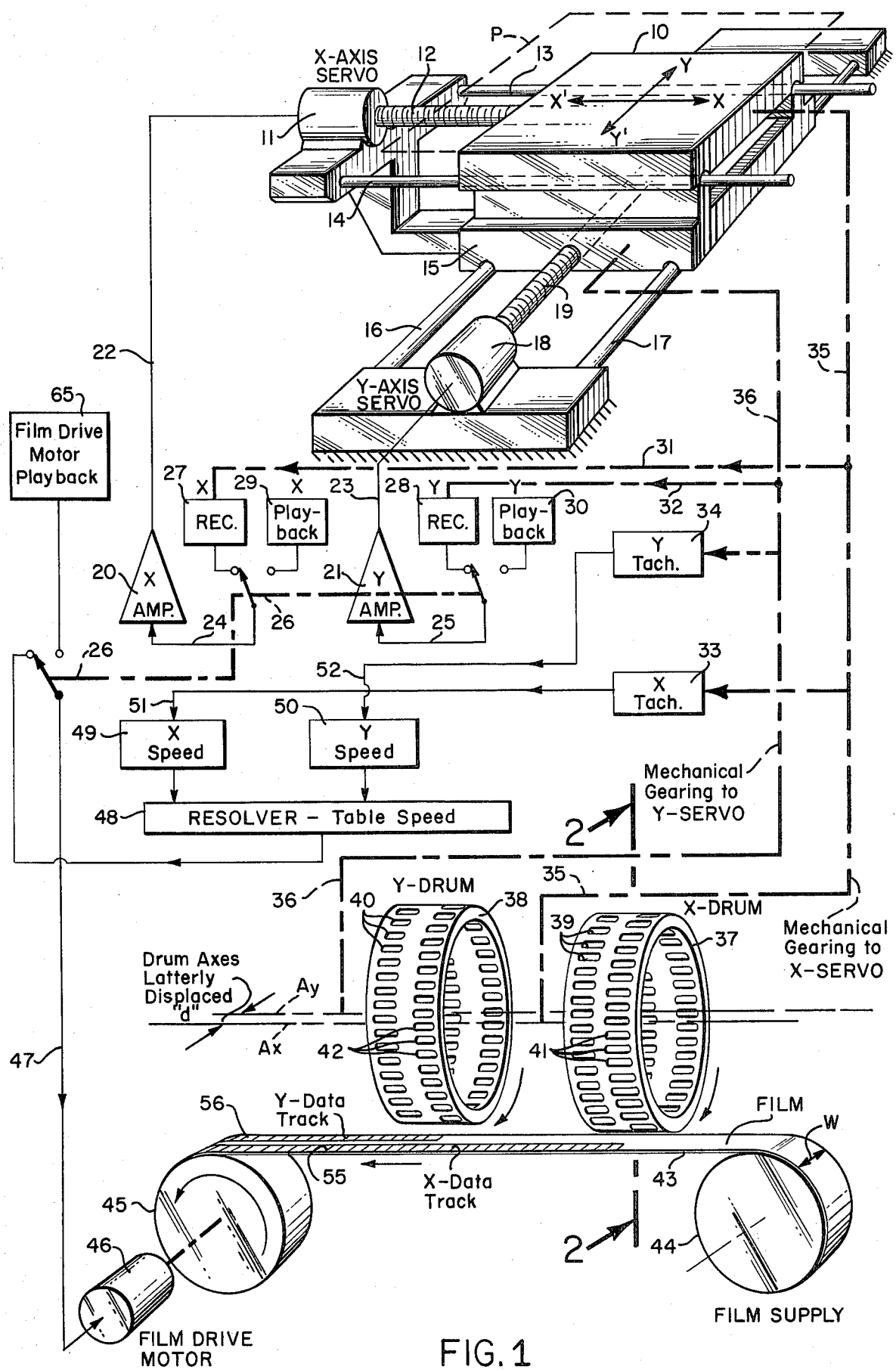
FIG. 1 is a schematic diagram partly in block form showing the basic components making up the analog data recording and playback system.

Referring first to the upper portion of FIG. 1 there is shown a table 10 mounted for movement in a path direction defined by X and Y coordinates in a rectangular coordinate plane P, the coordinate axes being designated X—X' and Y—Y'. While a table is shown as the object to be moved, other equivalent elements which require movement for machine operations are intended to be encompassed in the term "table" as used herein.

Movement of the table in the direction of the X—X' axis is accomplished by an X- servo motor 11 driving a lead screw 12 threadedly coupled to the table 10. As shown, the X- servo motor 11 is permanently fixed to a pair of parallel rails 13 and 14 along which the table 10 can slide. This entire structure in turn is carried by a carriage 15 supporting the rails 13 and 14 and the X- servo motor 11.

The carriage 15 is mounted for movement in the direction of the Y—Y' axis along a second pair of rails 16 and 17. Towards this latter end, there is provided a Y-axis servo motor 18 operating a lead screw 19 threadedly received in the carriage 15.

From the foregoing it will be clear that when the X- servo motor 11 is energized, the table 10 will move in the direction of the X—X' axis while energization of the Y servo motor 18 will move the table by means of the carriage 15 in the direction of the Y—Y' axis. By energizing both motors simultaneously at various relative speeds, the table 10 can be caused to follow any desired selected path in the X—Y coordinate plane P.

Referring to the block diagram at the central portion of FIG. 1 there are provided X and Y servo amplifiers 20 and 21 having their outlets connected through leads 22 and 23 to the X and Y servo motors 11 and 18 respectively. A recording energizing signal for operating the servo motors may be provided on input leads 24 and 25 for the amplifiers 20 and 21, respectively, through a switch means 26 from a recording signal generator for the X and Y motors indicated by the blocks 27 and 28. These recording input signals to control movement of the table by way of the servo motors may constitute analog voltages developed by suitable potentiometers or output signals from a pattern tracing stylus.

As will become clearer as the description proceeds, playback control signals for operating the servo motors to cause the table 10 to repeat a given routing are provided by X and Y playback signal sources shown by the blocks 29 and 30 respectively arranged to feed into the servo amplifiers 20 and 21 when the switch means 26 is moved from the terminals for the record blocks 27 and 28 to the terminals for the playback blocks 29 and 30.

Feed back signals generated in accordance with the actual movement of the table 10 during recording are fed into the recording blocks 27 and 28 of the servo amplifiers 20 and 21 as indicated by the dashed lines 31 and 32. Also tachometers 33 and 34 generate speeds signals in response to the actual physical movement of the table 10. This physical movement of the table is mechanically fed into the blocks 27 and 28 and the tachometers 33 and 34 as indicated by the dash dot lines 35 and 36 for the X and Y axes respectively.

As an example of the operation of the foregoing described elements, assume it is desired to move the table 10 in the direction of the X axis. A signal from the recording block 27 which may be provided by manual control of a stylus is passed through the switch means 26 to the input lead 24 for the servo amplifier 20. The output signal on line 22 will drive the X axis servo to move the table 10 in a direction along the X axis determined by the polarity of the signal. The movement of the table 10 will be communicated back to the stylus or block 27 through the mechanical connection 31 to provide a feedback signal which nulls the signal on lead 24 when the table has reached the selected position so that there will no longer be an output signal on lead 22 to drive the servo. In other words, the signal generated by movement of the table tends to null the input signal from the stylus to the amplifier 20, the table being connected to the stylus so that it moves only in the presence of an error signal. The Y servo operates in the same manner to control movements along the Y axis direction. Where a stylus is used, the record blocks 27 and 28 represent the stylus itself.

Referring now to the lower portion of FIG. 1, there is provided an X-drum 37 and a Y-drum 38. These drums are respectively mechanically geared to movements of the table 10 through the mechanical connections indicated by the dashed lines 35 and 36 to rotate respectively at rates proportional to the speed of movement of the table in the X and Y axes directions. Thus, the drum 37 will only rotate when the table is moving in the direction of the X axis or a component of its movement in the plane exists in the X direction. Similarly, the Y drum will only rotate at a rate proportional to movement of the table in the direction of the Y axis or of a component of the table movement in the direction of the Y axis.

As shown, each of the drums includes at least one circumferential row of peripheral slots as indicated at 39 and 40 respectively parallel to the axis of the associated drum. Also, in the particular embodiment shown, each of the drums includes a second row of circumferential slots as indicated at 41 and 42. The slots in the first rows 39 and 40 are all of the same width and are separated circumferentially from each other by the same distance as the width. The same is true for the second row of slots 41 and 42 but these latter rows are circumferentially offset from the first rows by the width dimension of the slot so that a slot in the second row occurs in a position between two adjacent slots in the first row. The purpose for this particular construction is a consequence of using negative film and will become clearer as the description proceeds.

A photographic negative film 43 which may comprise a conventional 35-mm. film is supplied from a supply spool 44 and positioned to pass adjacent the peripheries of the drums 37 and 38. As shown, the film may be driven in the direction of the arrow from right to left as viewed in FIG. 1 by a take-up sprocket 45 and suitable film drive means in the form of a motor 46.

It will be noted in FIG. 1 that the drums 37 and 38 are spaced one ahead of the other and have their axes designated Ax and Ay parallel to each other and displaced laterally by a distance "d". The displacement "d" is less than the width of the film, the displacement being provided so that recording data may take place on parallel tracks on the film 43 all as will become clearer as the description proceeds.

The film drive means in the form of the motor 46 is of variable speed and controlled by an input signal on line 47 derived from a resolver 48 through a switch arm of switch means 26. Resolver 48 receives input signals proportional respectively to the speed of movement of the table in the X and Y directions as indicated by the blocks 49 and 50. Thus, there are shown input leads 51 and 52 from the X tachometer 33 and Y tachometer 34 passing into the X and Y speed blocks 49 and 50 which provide appropriate signals to the resolver which in turn generates a signal proportional to the vector sum of the speeds and thus to the absolute speed of the table along any selected path. The film drive motor 46 will thus move the film 43 at a speed directly proportional to the speed of movement of the table.

A recording source of light (not shown in FIG. 1) is directed radially from the interior of each drum towards the film so that bars of light images are successively exposed on the film along parallel X and Y film tracks indicated at 55 and 56. These film tracks are separated by the given distance of lateral displacement of the axes of the X drum and Y drum indicated as "d" in FIG. 1 as described heretofore.

Referring now to the enlarged cross section of FIG. 2, details of the X drum recording operation will be described. Since the recording effected by the Y drum is identical, a detailed description of one will suffice for both.

As shown in FIG. 2, the recording light source is schematically indicated at 57 for directing light from a 45° mirror 58 radially through the slots making up the first row of slots 39 in the drum 37 towards the film 43. When the drum 37 is rotating so that the slots are moving transverse to the films; that is, in a direction out of the plane of the drawing and when the film is moving in a longitudinal direction, the resulting successive bars of light images will be skewed relative to the direction of movement of the film in accordance with the relative rate of rotation of the drum and speed of movement of the film. For example, if the rate of movement of the slots transverse to the film is equal to the speed of movement of the film in a longitudinal direction, the bars of light images will be skewed 45°. An upper mask 59 is provided so that the length of the spot of light along the film is a small fraction of its width across the film to avoid the widening of the developed opaque recorded light images as they become skewed. It further restricts the recording track to its assigned width.

There are thus recorded on the X track of the film after it is developed patterns of bars of opaque light images defining the movement of the table in the X axis direction of the coordinate plane. It will be understood as described in FIG. 1 that a similar pattern of bars of light images are simultaneously recorded on the Y track portion of the film to thereby record movements of the table in the direction of the Y axis of the coordinate plane.

Also illustrated in FIG. 2 is a playback system for causing the table to move automatically in accord with the selected path as programmed or recorded on the film 43. This playback system includes a playback collimating light means 60 made up of two collimated light sources 60a and 60b for directing light through a lower mask 61, through the film 43, the second row of slots 41, and lens 62 to photo-cell means 63 made up of photocells 63a and 63b (FIG. 4). It will be recalled that the second row of circumferential slots are circumferentially off-set from the first row so that in the position of the drum illustrated in FIG. 2 no slot 41 is visible when the slot 39 is in the position illustrated. The reason for this arrangement in the playback mode is the fact that when the film 43 is developed, the exposed portions will become dark while the unexposed portions become transparent; in other words, a negative film is provided.

Thus, when light can pass both through a light portion of the film, and a playback slot, the drum will be in the precise position it was when the light image on the film was recorded.

It should be understood with respect to the foregoing however, that a positive film might be treated so as to avoid the reversal aspect of the images so that the same recording slots making up the first circumferential row 39 could be utilized in the playback operation.

Still referring to FIG. 2, the output of the photocell means 63 passes to a differential amplifier 64 to provide an output signal passed to the X playback block which is designated 29 in FIG. 1. Similar playback components are provided for the Y drum to connect to the Y playback block 30 of FIG. 1.

Referring to FIG. 3, there is shown an example of the patterns of bars of opaque light images recorded on the X track of the film as at 65. When the bars of light images are at 45° with respect to the longitudinal direction of movement of the film and as described heretofore, the speed of movement of the film and the rate of rotation of the drum are exactly equal. If the rate of rotation of the drum is slower than the speed of movement of the film, the light bars will tend to extend more in the direction of movement of the film whereas if the rate of rotation of the drum is faster than the speed of movement of the film, the light bars will tend to extend transversely to the direction of movement of the film. When a reversal of the motion of the table takes place, there will be a reversal of the rotational direction of the drum which, as stated, is mechanically geared directly to the table. The pattern of light bars will then be skewed in an opposite direction.

FIG. 3 illustrates the light bars as they would appear on the film when a reversal of the table direction takes place.

It will be appreciated from the foregoing description thus far that the film 43 will have optically recorded thereon adjacent patterns of bars of light images defining respectively the movement of the table 10 in the X and Y directions of the coordinate axis system and thus fully define any desired routing of the table in the X—Y plane. The film can thus be stored and will represent a table routing program which may subsequently be played back to cause the table to automatically follow the identical selected path which the table followed during the recording operation.

Essentially, the playback technique which utilizes the same drums as used in recording and the same film transport arrangement involves causing the drums to remain in the same synchronous relationship with the X and Y patterns on the film as was effected during recording.

Thus, since each of the drums are directly mechanically geared to the table, if the drums are caused to rotate upon movement of the film during playback in a manner in exact synchronism with the film corresponding to that which occurred during recording, such rotation will automatically move the table through identical movements as occurred during recording.

Referring now to FIGS. 4 and 5, the manner in which the playback system described briefly in FIG. 2 functions to maintain the synchronism of the drums with the moving playback film will be described.

Referring to the front view in FIG. 4, it will be noted that the playback collimating light means comprises first and second light sources 60a and 60b positioned respectively to pass collimated playback light beams through adjacent light bars recorded on the film and corresponding adjacent slots 41 in the second row of peripheral slots of the drum 37. In this respect, a lower mask 61 defines the light beams to a length along the film which is a small fraction of the width between opaque bars of light images so that the total light will stay constant during skewing. It further restricts the light beams to a width across the film which is well within the width of the recorded track, but, equally important, it limits the width to two exact sections (a section being a bar and a space) so that the total light remains the same as the pattern moves across the film. Constant light reduces error signal pulses and consequently gives smoother servo operation. Any number of complete sections may be used.

The beam from the light source 60a passes through both slots as shown and thence through a lens 62 to be focused on a photo-cell 63a constituting one of a pair of photo-cells making up photo-cell means 63.

Similarly, the beam from the light source 60b passes between the same light bar images on the film and the same slots 41 on the drum 37 and lens 62 to be focused on the second photo-cell 63b making up the pair of photo-cells.

The respective outputs of the photo-cells pass into a differential amplifier 64 which in turn will provide a playback signal to the X playback block 29 of FIG. 1.

It will be evident from FIG. 4 that when the drum 37 is in exact synchronism with the movement of the film the intensities of light striking the photo-cells 63a and 63b will be equal so that there will be no output signal from the differential amplifier 64. However, should the drum 37 tend to move out of synchronism with the moving film, a signal will be developed which will move the table through the playback mechanism of FIG. 1 which movement in turn through the mechanical coupling to the drum will accelerate or decelerate movement of the drum to bring it back into synchronism with the moving film.

The foregoing can better be understood by referring to FIG. 5 wherein the drum 37 is shown displaced slightly to the left and thus out of synchronism slightly with the moving film. As is evident from FIG. 5, under these conditions the amount of light passing to the photo-cell 63a is substantially greater than the amount of light received by the photo-cell 63b and thus the intensities are different and a signal is developed in the differential amplifier 64 of FIG. 4.

Referring back to FIG. 1, the signal from the differential amplifier 64 passes to the playback block 29 which will then pass a signal to the servo amplifier 20, the switch means 26 being thrown to the playback block terminals during playback. The signal in the servo amplifier 20 will then energize the X servo motor to move the table 10 and through the mechanical gearing to the X drum cause the drum to accelerate or decelerate in a manner to bring it back into exact synchronism with the film. As stated, when in exact synchronism, the amount of light falling on the two photo-cells 63a and 63b is equal so that there is no appreciable signal from the differential amplifier 64. It will be understood, of course, that there is always a slight error signal which drives the table always in a direction tending to minimize the error signal in the manner of the usual servo feedback operations.

The Y axis drum operates in an identical manner, the drum following the bars of light images on the Y track of the film. Since both the X and Y movements are recorded simultaneously on a single film, the identical movements in proper relationship will necessarily take place during playback.

The same recording optical and playback system can be utilized to effect further operations in addition to that of causing the table to be routed along a selected path. For example, a portion of the film between the X and Y tracks could contain dark and light areas for triggering a photo-cell which would cause the table carrying, for example, drilling tools to move up or down in a vertical or Z axis direction.

When in the playback mode, the film can be driven at a selected constant speed and towards this end, the motor 46 of FIG. 1 is driven by block 65 rather than by the resolver output through the switch arm of switch means 26 when in the playback position.

It will be appreciated that certain variations in the system can be effected without departing from the scope and spirit of the invention. For example, a photo-cell phase reversal could be provided producing a lock in of drum synchronism with the film when an opaque film line lines up with a drum slot to achieve balance with zero light on the cells rather than maximum light.

Further, the total number of slots in a circumferential row can be increased which would cause a faster rate of light change for a higher servo gain and better accuracy. However, there would be sacrificed stability and an increased chance of the drum dropping out of synchronism would be present. Decreasing the total number of slots would result in a slower rate of light change for a lower servo gain and less accuracy but there would be greater stability and a decreased chance of the drum dropping out of synchronism with the film.

The gear ratio between table movement and drum rotational rate can be changed to increase resolution (faster drum), or to increase the table travel distance at the expense of resolution (slower drum).

Finally, obvious modifications in the geometry of the drum and film distances, mask dimensions, light source angles and so forth can be used.

From the foregoing description, it will be evident that the present invention has provided a unique analog type data recording and playback system for controlling path movements particularly useful in various machining operations wherein a supporting table for a work is to be routed along a selected path and it is desired to store the routing program.

What is claimed is:

1. A method of recording and reproducing from such recording movement of a table along a selected path, comprising the steps of:
   a. moving said table along said selected path;
   b. simultaneously moving a photographic film in a longitudinal direction at a speed proportional to the speed of movement of said table;
   c. mechanically coupling a row of light apertures to said table to cause said light apertures to pass transversely across said film at a rate determined by the speed of movement of said table;
   d. passing a light beam through said apertures towards said film to thereby successively expose on said film bars of light images as said film moves, said bars being skewed relative to the direction of movement of said film in accordance with the relative rate of movement of said apertures and speed of movement of said film whereby there is optically recorded on said film a pattern of bars of light images defining the movement of the table along said selected path;

e. moving said film in a longitudinal direction at a selected speed;

f. providing a row of light apertures mechanically coupled to said table so that they will pass transversely across said film once said table moves, said light apertures being spaced relative to each other the same as the light apertures utilized in recording;

g. passing light from two sources through two adjacent bars of light images on said film and two adjacent apertures overlying said film;

h. detecting the relative intensities of the light from each of the two sources, and i. moving said table to thereby move said apertures in response to the difference in light intensities in a direction to minimize such difference so that the apertures will stay in synchronism with the bars of light images on the moving film and said table will follow said selected path defined by the pattern of bars of light images on said film.

2. An analog data recording and playback system for controlling movement in a path direction defined by X and Y coordinates in a rectangular coordinate plane, comprising, in combination:

a. a table mounted for movement in said plane;

b. an X-servo motor coupled to said table to move said table in the direction of the X-coordinate axis in said plane when energized;

c. a Y-servo motor coupled to said table to move said table in the direction of the Y-coordinate axis in said plane when energized;

d. an X-drum mechanically geared to movements of said table to rotate at a rate proportional to the speed of movement of said table in the X-axis direction;

e. a Y-drum mechanically geared to movements of said table to rotate at a rate proportional to the speed of movement of said table in the Y-axis direction, said X-drum and Y-drum each including at least one circumferential row of peripheral slots parallel to the axis of the associated drum, the drums being spaced one ahead of the other and having their axes parallel and laterally displaced by a given distance;

f. a negative photographic film of given width greater than said given distance;

g. film drive means for moving said film in the axial directions of said drums adjacent to their exterior peripheries;

h. resolver means responsive to the vector sum of the speeds of movement of said table in the X and Y axes directions connected to said film drive means to move said film at a speed directly proportional to the speed of said table in said plane;

i. a recording source of light directed radially from the interior of each drum towards said film so that bars of light images are successively exposed on said film along parallel X and Y film tracks separated by said given distance of lateral displacement of the axes of said X drum and Y drum as said drum rotate and said film moves, the successive bars of light images of the X and Y tracks being skewed relative to the direction of movement of the film in accordance, respectively, with the relative rates of rotation of the drums and speed of movement of said film whereby there is simultaneously optically recorded on said X and Y tracks of the film patterns of bars of light images defining, respectively, given movements of said table in the X and Y directions of said coordinate plane; and j. playback means including photo-cell means and switch means for connecting said photo-cell means to the X and Y servo motors, said X and Y drums each having a second row of circumferential peripheral slots spaced apart the same direction as the slots in the first row and circumferentially displaced by the width dimension of one slot; two light sources for each drum, said photo-cell means being responsive to light from the sources passing through said X and Y film tracks respectively and the second rows of slots respectively to cause the table to execute said given movements in accordance with the patterns of bars of light images in said tracks by means of signals developed in said photo-cell means responsive to any tendency for the X and Y drums to rotate out of synchronism with the X and Y track patterns on said film, said photo-cell means including for each drum a pair of photo cells positioned to receive light passing through the film track and associated second row of slots in the drum, the pair of photo cells being positioned such that when the relative intensity of light from each of the two light sources differs, the associated drum and table are driven by the associated servo motor to vary the rate of rotation of the drum relative to the speed of film movement in the playback operation to minimize such difference, whereby the table will be moved along a path in the X and Y coordinate plane defined by the originally optically recorded program of given movements on said film.

* * * * *